(12) United States Patent
Doczy et al.

(10) Patent No.: US 6,448,548 B1
(45) Date of Patent: Sep. 10, 2002

(54) VEHICLE SIGNAL CONTROL MODULE AND SYSTEM

(75) Inventors: Emil Doczy, Edwardsburg, MI (US); Earl H. Whetstone, Granger, IN (US)

(73) Assignee: Dee Enterprises, LLC, Elkhart, IN (US)

( * ) Notice: Subject to any disclaimer, the term of this patent is extended or adjusted under 35 U.S.C. 154(b) by 0 days.

(21) Appl. No.: 09/273,088

(22) Filed: Mar. 19, 1999

Related U.S. Application Data
(60) Provisional application No. 60/079,297, filed on Mar. 25, 1998.

(51) Int. Cl.[7] ................................................. B60G 1/34
(52) U.S. Cl. .................... 250/221; 200/61.54; 340/475; 340/477
(58) Field of Search ................................. 250/221, 216, 250/551, 229; 200/61.27, 61.32, 61.54; 340/468, 475, 477, 476, 471

(56) References Cited

U.S. PATENT DOCUMENTS

| | | | | |
|---|---|---|---|---|
| 4,333,071 A | * | 6/1982 | Kira et al. ................... | 340/477 |
| 4,972,174 A | * | 11/1990 | Onan et al. .................. | 340/477 |
| 5,260,685 A | * | 11/1993 | Parker ......................... | 340/477 |
| 5,780,795 A | * | 7/1998 | O'Reilly ................... | 200/61.54 |

* cited by examiner

Primary Examiner—Kevin Pyo
(74) Attorney, Agent, or Firm—Baker & Daniels

(57) ABSTRACT

A switching mechanism for controlling vehicle headlights, turn signals, and emergency flashers includes a housing mounted on a control stock rigidly mounted to the vehicle steering column. The housing includes depressions for each of the functions, and light source and optical responsive switch on opposite sides of each depression, the light source being aimed at the optical switch whereby a light beam traverses the depression. A controller is responsive to interruption of the beam by the vehicle operator placing a finger in the depression to control the corresponding vehicle function.

22 Claims, 5 Drawing Sheets

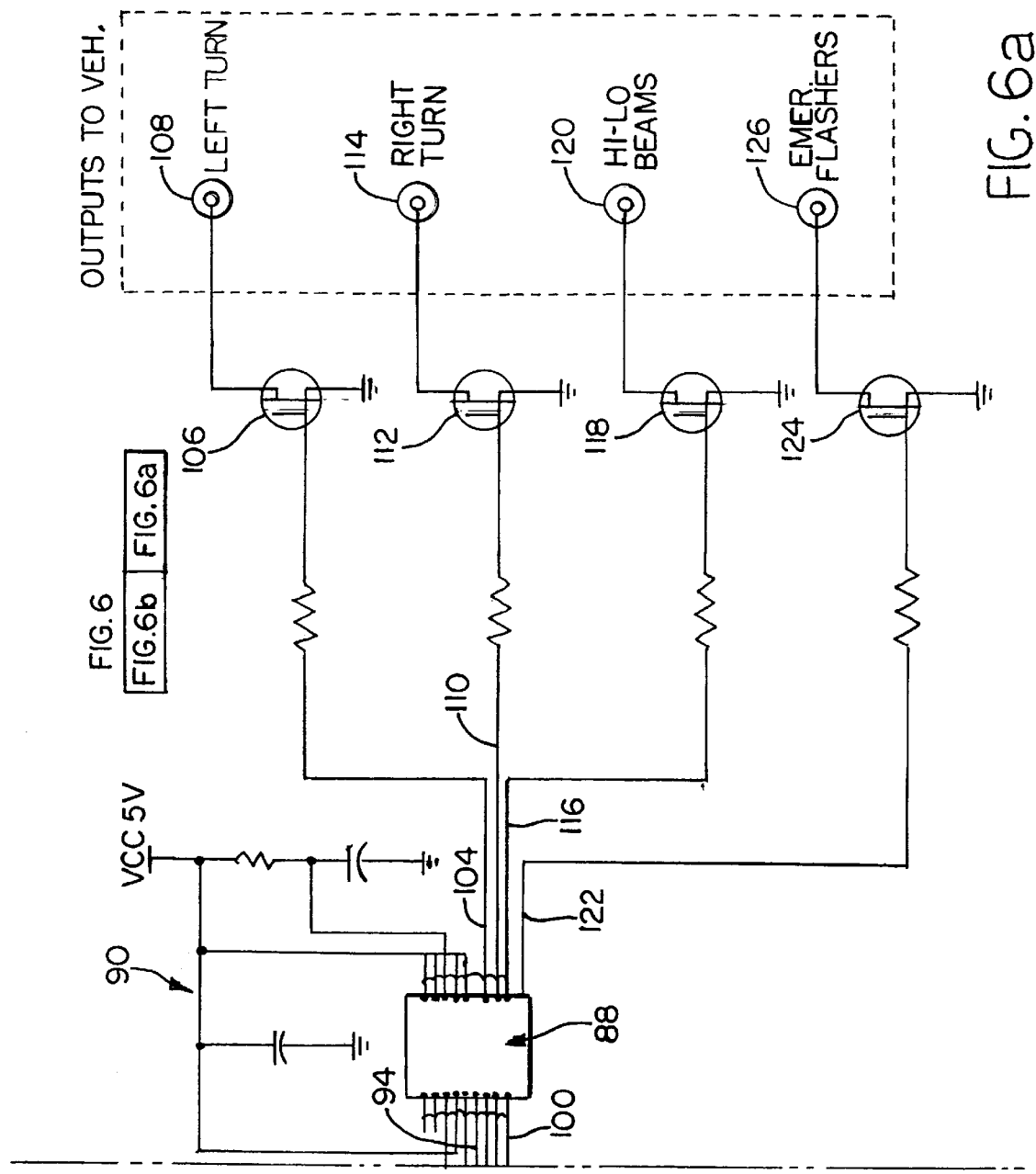

VEHICLE SIGNAL CONTROL MODULE AND SYSTEM

This application claims benefit of provisional application No. 60/079,297, filed Mar. 25, 1998.

BACKGROUND OF THE INVENTION

This invention relates to a vehicle signal control module and system for controlling the turn signal lamps, emergency flasher lamps, and high/low headlight beams of an automotive vehicle, and is particularly suited for heavy duty vehicles such as buses and tractor trailer combination vehicles.

SUMMARY OF THE INVENTION

Automotive vehicles, including heavy duty vehicles such as buses and tractor-trailer heavy duty combination vehicles, are equipped with turn signal control systems which include a stock projecting from the steering column which is operated by the vehicle operator to control switching to operate the vehicle turn signals. These switches are electromechanical devices and, in the case of heavy duty trucks and buses used in congested areas, are operated multiple times daily and often wear out long before the vehicle wears out. Accordingly, it has become common, particularly with such heavy duty vehicles, to provide aftermarket replacement controls for repair purposes, which are relatively expensive in component costs as well as vehicle down time. In addition to turn signals, modem vehicles are equipped with emergency flasher lights, which require a separate control, and are also equipped with high/low headlight beam controls, which are also separate from the turn signal and emergency flasher control switches.

In the case of heavy duty tractor/trailer combination vehicles and buses, the vehicle when effecting a turn must first pull out in a direction opposite the direction in which the turn is made and then effect the turn, all to permit the rear portion of the vehicle to pull smoothly around the comer. This pre-turn will cause a mechanically self-controlling switch to cancel the turn indicators prior to the actual turn or completion of the turn. Accordingly, turn signal control units used on heavy duty vehicles are generally not self canceling, as are the turn signal controls used on passenger cars and other smaller vehicles. The driver of a heavy vehicle tractor/trailer combination vehicle must remember to manually move the turn signal control stock back to the off position after the turn has been effected.

Accordingly to the present invention, the switch housing is mounted on the end of a control stock which is rigidly mounted to the vehicle's steering column. Depressions or cavities are provided in the top, side and end edges of the housing and are sized to accommodate a finger a human hand. A light source, such as a light emitting diode, emits a beam of infrared light which traverses the cavity of the depression. An optically responsive solid state switch is mounted on the opposite side of the cavity or depression from the light emitting diode and normally receives the beam from the diode. The light emitting diode and the optically responsive switch are connected to a microprocessor which is responsive to the signal emitted by the switch when the beam of light is broken to actuate the turn signals. Accordingly, the operator of the vehicle merely inserts a finger in the corresponding depression or cavity to actuate the left or right turn signals. The signal remains on until the operator again places his finger in the depression or cavity to turn the signal off or is switched off by the microprocessor acting on vehicle speed information. A similar depression or cavity and switching arrangement is provided in the end of the housing to control the vehicle high/low beam head lamps, and a cavity is provided in the top of the housing to control the emergency flashers. Accordingly, these functions are controlled from a single stock and housing, which may be manufactured relatively inexpensively, and which requires no moving parts. Accordingly, the life of the unit is substantially indefinite.

BRIEF DESCRIPTION OF THE DRAWING FIGURES

These and other features of the present invention will become apparent from the following description, with reference to the accompanying drawings, in which.

DETAILED DESCRIPTION OF THE PREFERRED EMBODIMENTS

Figure 1:
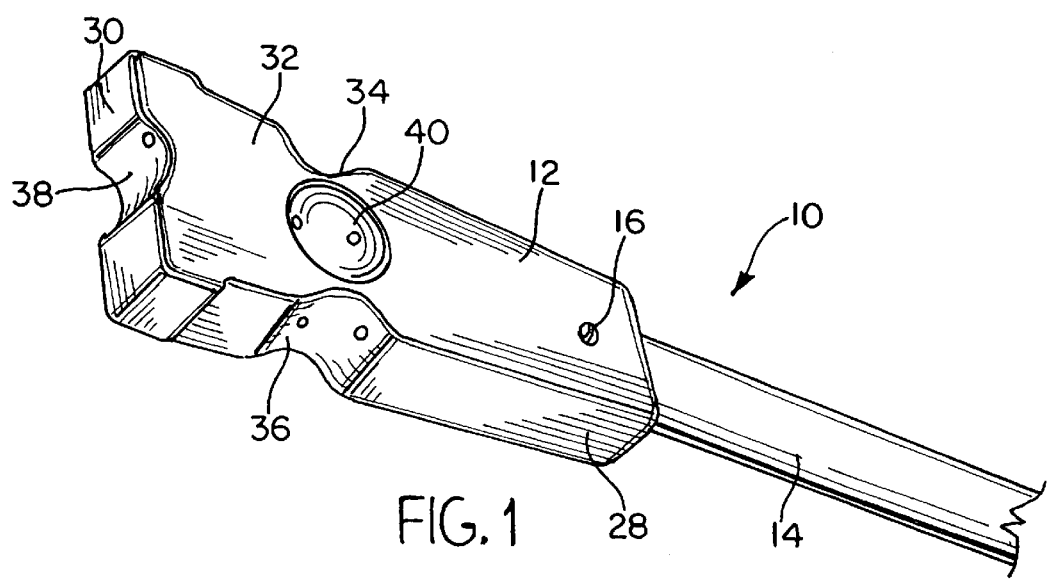
FIG. 1 is a view in perspective of a switching mechanism made pursuant to the teachings of the present invention.
Figure 2:
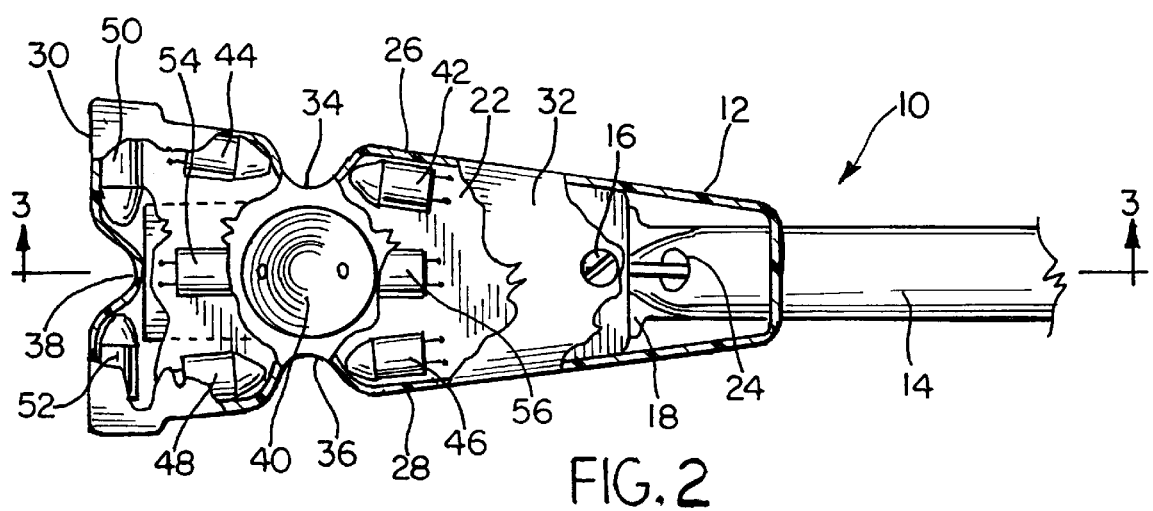
FIG. 2 is a top plan view, partly in section, of the switching mechanism illustrated in FIG. 1.
Figure 3:
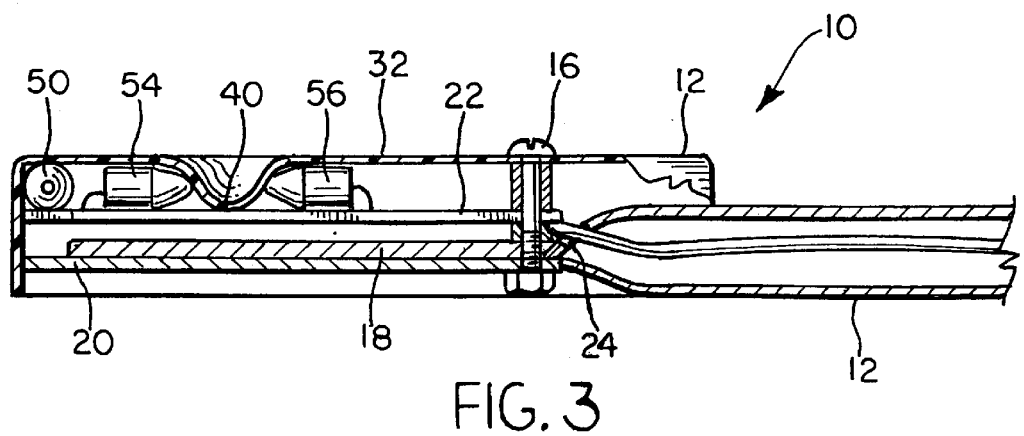
FIG. 3 is a cross sectional view taken substantially along lines 3—3 of FIG. 2.
Figure 4:
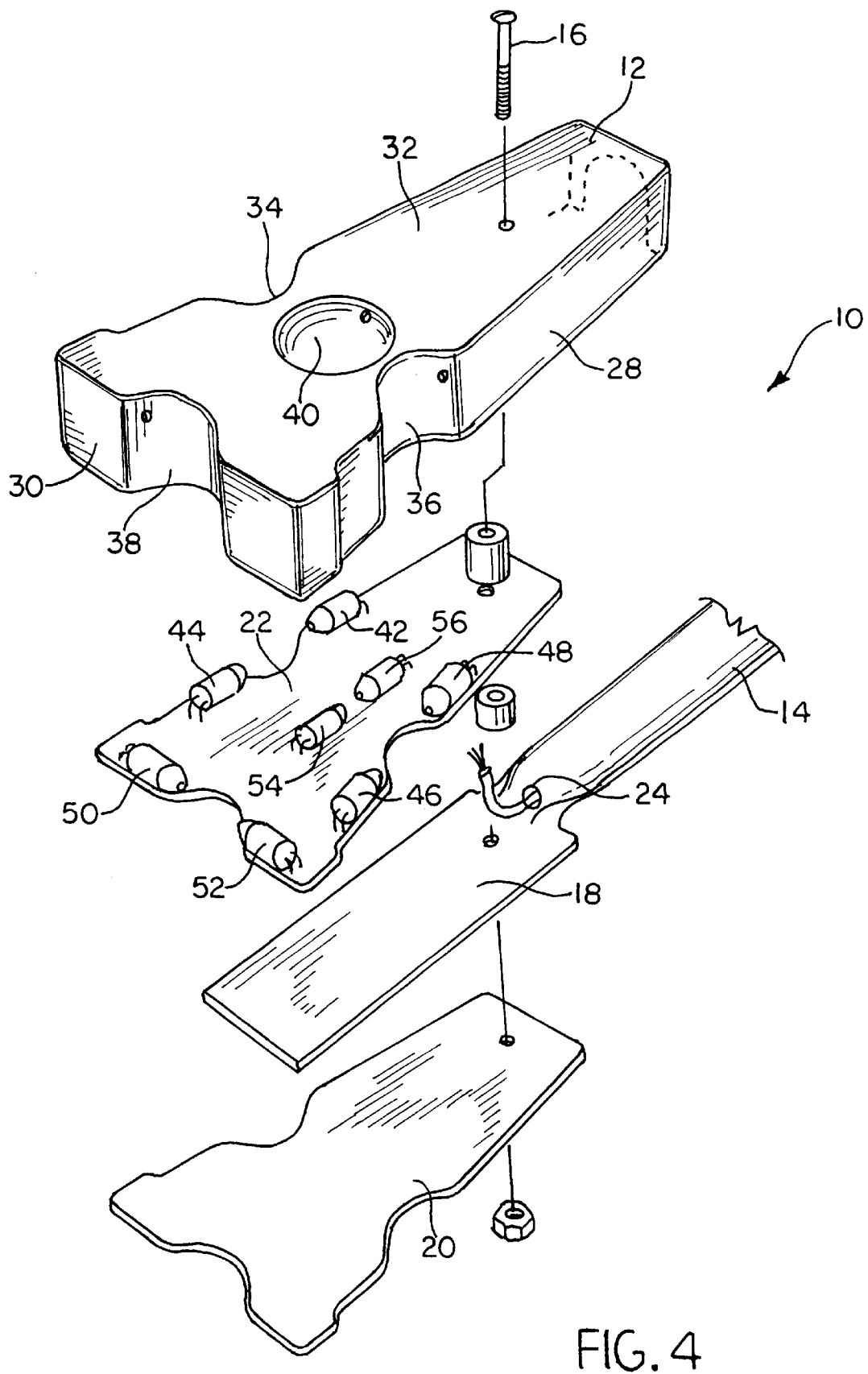
FIG. 4 is an exploded view in perspective of the switching mechanism illustrated in FIGS. 1–3.

Referring now to the drawings, a vehicle signal module generally indicated by the numeral 10 includes a housing 12 which is rigidly mounted to a stock 14 by a fastener 16 which extends through the housing 12, a flattened portion 18 of the stock 14 and a bottom cover member 20. The stock 14 is rigidly mounted on the vehicle steering column. A printed circuit board 22 is mounted between the housing 12 and the cover member 20 to provide the necessary electrical connections within the housing 12 as will hereinafter be explained. The stock 14 is provided with an opening 24 to permit wires fed through the stock 14 to be connected to the circuit board 22.

The housing 12 includes a side edge 26, an opposite side edge 28 an end edge 30, and a transverse surface 32 extending between the edges 26, 28 and 30. The orientation of the various surfaces 26–32 is illustrated in FIG. 1 in the positions which they assume when the stock 14 is installed on the aforementioned steering column (not shown). Depressions or cavities 34, 36 and 38 and 40 are provided in the top 32, end 30 and transverse edges 26–28 respectively. The depressions or cavities 34–40 are sized to accept a human finger. Holders 42, 44 support a conventional light emitting diode and a optically responsive solid state switch respectively on opposite sides of the depression 34. Accordingly, a light beam emitted by the light emitting diode transverses the cavity 34 and is received by the optically responsive switch mounted in holder 44. Accordingly, when the operator inserts a finger into the depression or cavity 34, the beam transmitted by the light emitting diode in holder 42 and received by the solid state switch in holder 44 is interrupted. Similar holders 46 and 48; 50 and 52; and 54 and 56 are installed on opposite sides of the cavities 36, 38 and 40 respectively. Accordingly, when a human finger is inserted in any of the cavities 34–40, the corresponding light beam transmitted by the corresponding light emitting diode and received by the optically responsive solid state switch will be broken.

Figure 5:
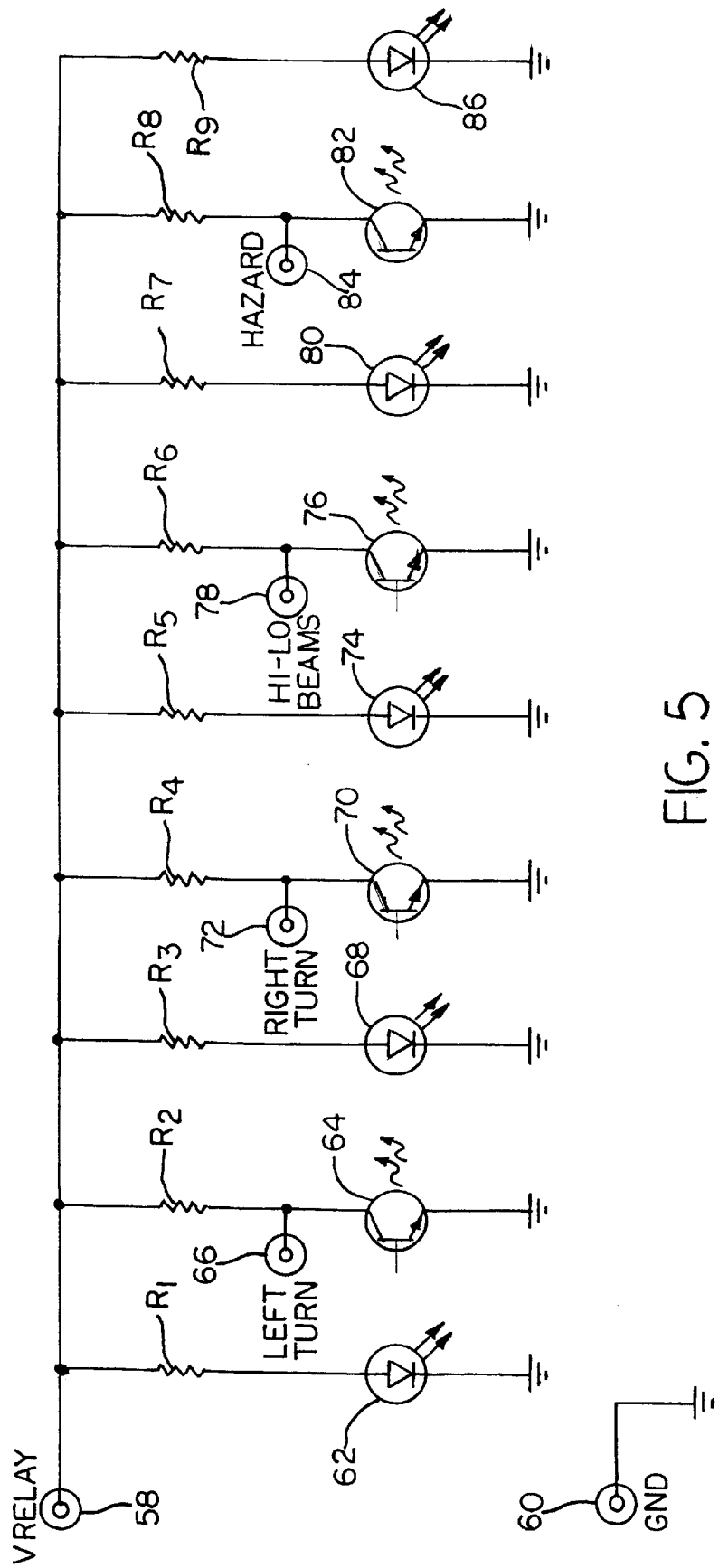
FIG. 5 is an electrical schematic illustrating the manner in the various components of the housing illustrated in FIGS. 1 and 2 are electrically interconnected.

Referring now to FIG. 5 which illustrates schematically the various electrical connections within the housing 12 provided by the circuit board 22, connectors 58, 60 provide connections with the regulated vehicle voltage supply and ground respectively. A light emitting diode 62 is connected between the power supply and ground through a bias resistor R1, and an optically responsive solid state switch 64 is connected between power supply and ground through a bias resistor R2. The light emitting diode 62 and switch 64 are installed in holders 42, 44, and, as discussed above, the switch 64 responds to breaking of the beam provided by the light emitting diode 62 to change the state of the signal at left turn output terminal 66. Similarly, light emitting diode 68 and optically responsive solid state switch 70 are connected between power and ground through bias resistors R3 and R4 respectively, and are installed within holders 46 and 48 on opposite sides of the depression or cavity 36. The switch 70 responds to an interruption of the light beam received from light emitting diode 68 to change the state of the signal at the output terminal 72. Still another light emitting diode 74 and optically responsive solid state switch 76 are connected between power and ground through appropriate bias resistors R5 and R6 respectively. The light emitting diode 74 and switch 76 are installed in holders 50 and 52 on opposite sides of the depression or cavity 38. The switch 76 is responsive to interruption of the beam of light received from light emitting diode 74 to change the state of the signal at output terminal 78. Light emitting diode 80 and optically responsive solid state switch 82 are connected between power and ground through appropriate bias resistors R7 and R8. The light emitting diode 80 and switch 82 are installed in holders 54, 56 on opposite sides of the cavity or depression 40. The switch 82 responds to interruption of the beam of light received from light emitting diode 80 to change the state of the signal at output terminal 84. A light emitting diode 86 is connected between the power and ground through a bias resistor R9 and is mounted on the housing 12 in an appropriate place (not shown) to provide an indication that power is being supplied to the housing.

Figure 6B:
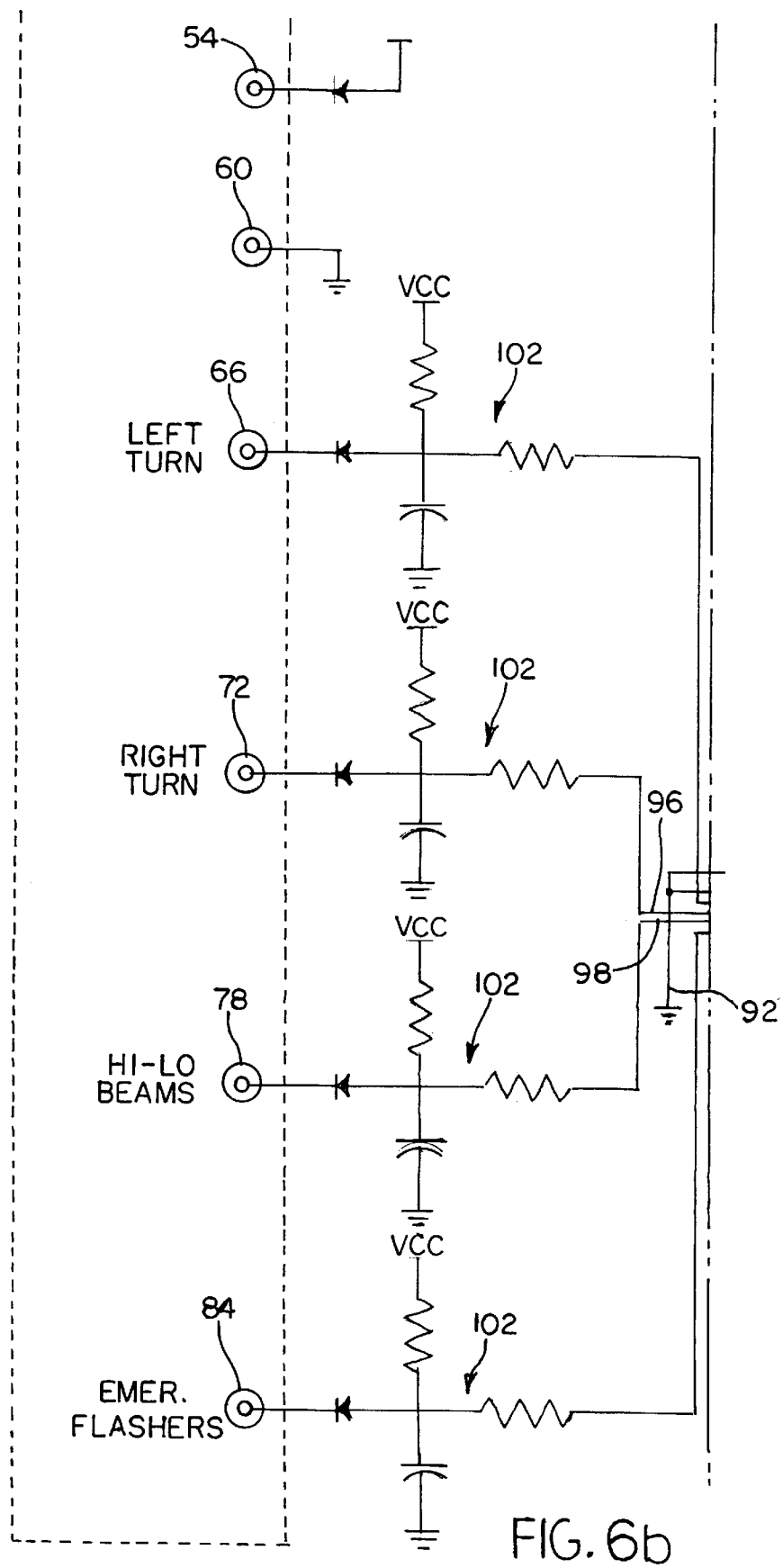
FIG. 6 is an electrical schematic illustration of the manner in which the output of the switching device illustrated in FIGS. 1 and 2 controls various vehicle functions.

Referring now to FIG. 6, a microprocessor generally indicated by the numeral 88 is connected to power through a conventional regulating and filtering circuit generally indicated by the numeral 90 and is also connected to ground as indicated at 92. Input terminal 94 of microprocessor 88 is connected to terminal 66, terminal 96 of microprocessor 88 is connected to terminal 72 input terminal 98 of microprocessor 88 is connected to terminal 78, and input terminal 100 of microprocessor 88 is connected to terminal 84. Each of the terminals 66, 72, 78 and 84 are connected to their corresponding input terminals of microprocessor 88 through appropriate voltage regulating filtering and protection circuitry generally indicated by the numeral 102. The microprocessor 88 also has an input (not shown) connected to a signal representing vehicle speed from the multiplex data buss.

Output terminal 104 of microprocessor 88 is connected to a solid state switching device 106, which is responsive to a change of state of terminal 104 to switch left turn signals connected to a terminal generally indicated at 108. Output terminal 110 of microprocessor 88 is connected to solid state switching device 112, which is responsive to a change of state of output terminal 110 to switch the right turn signals connected to a terminal generally indicated by the numeral 114. Output terminal 116 of microprocessor 88 is connected to a solid state switch 118 which is responsive to a change of state on terminal 116 to switch the vehicle head light beams from the high beam to the low beam (or vice versa) which are connected to terminal generally indicated by the numeral 120. Output terminal 122 of microprocessor 88 is connected to solid state switching device 124 which is responsive to a change of state on terminal 122 to switch on or off the vehicle emergency flashers connected to a terminal generally indicated by the numeral 126.

In operation, when the vehicle operator desires to signal a left turn, the operator places a finger in the cavity or depression 34, thereby interrupting the beam between the light emitting diode 62 and the optically responsive solid state switch 64. Accordingly, the signal at terminal 66 changes state and microprocessor 88 responds to this change of state (which is transmitted to the microprocessor through input terminal 94) to generate a signal switching the solid state switch 106 to turn on the left turn signals connected to terminal 108. Microprocessor 88 is programmed to maintain the signal on output terminal 104 even after the operator removes his finger from cavity or depression 34, whereupon the optically responsive solid state switch 64 switches back to its initial state, thus removing the signal from input terminal 94 of microprocessor 88. Microprocessor 88 is programmed to turn off solid state switch 106 by changing the state on output terminal 104 if the vehicle operator again places his finger in the cavity 34 causing the terminal 94 to change state, and is also programmed to turn off the solid state switch 106 if the vehicle speed exceeds a predetermined level. When the vehicle operator desires to signal a right turn, the vehicle operator places a finger in the cavity 36 thereby causing optically responsive solid state switch 70 to signal microprocessor 88 to turn on solid state switch 112 to actuate the right turn signals connected to terminal 114. Of course, the vehicle operator turns off the right turn signals by again placing the finger cavity 36 thereby signaling microprocessor 88 to turn solid state switch 112 off. The microprocessor is also programmed to turn off switch 112 when the vehicle speed attains a predetermined level and/or a predetermined time period has elapsed. It will be noted that the stock 14 is conveniently mounted the steering wheel so that the vehicle operator may place a finger in the cavity 34 or 36 without removing his hand from the wheel. This concept is such that the switch is totally independent of the vehicle steering column. It may be located in any location which is ergonomically desirable.

When the vehicle operator desires to switch the vehicle head lamps to high beam from low beam, the vehicle operator places a finger in the cavity 38, thereby causing optically responsive solid state switch 76 to change the state on terminal 78 which signals microprocessor through input terminal 98 to change the state on output terminal 116 thereby switching the solid state switching device 118 to switch the head lights connected to terminal 120 to the high beams. The microprocessor 88 is programmed to maintain the signal on the terminal 116 even after the vehicle operator has removed his finger from cavity 38. When the vehicle operator again places his finger in cavity 38, the microprocessor 88 responds to the signal transmitted to input terminal 98 to switch solid state switch 118 back to its initial state, thereby switching the head lights from the high beams to the low beams.

When the vehicle operator desires to actuate the vehicle warning flashers, the vehicle operator places a finger or thumb in the cavity 40, thereby causing the optically responsive solid state switch 82 to change the state on terminal 84.

This change of state is communicated to microprocessor 88 through input terminal 100, which responds to change the state on output terminal 122, causing the solid state switch 124 to switch on the emergency flashers 126. These emergency flashers remain on after the vehicle operator removes his finger or thumb from cavity. When the vehicle operator again places his finger or thumb in cavity 40, microprocessor 88 responds to the corresponding change of state on input terminal 100 to change the state of output terminal 122, thereby switching off the solid state switch 124 to turn off the flashers connected to the terminal 126. Microprocessor 88 is also programmed to turn off and/or prevent the turning on of the flashers connected to terminal 126 when the vehicle speed exceeds a predetermined level.

What is claimed is:

1. Switching mechanism for controlling a vehicle function comprising a housing having at least one depression, a light source mounted within said housing on one side of said depression and an optically responsive switch on the other side of the depression, said light source being aimed at the optical switch whereby a light beam normally traverses said depression, said optical switch being operated in response to interruption of said light beam, and control means responsive to said optical switch for controlling said vehicle function, whereby the vehicle operator controls said vehicle function by placing a finger in the depression.

2. Switching mechanism as claimed in claim 1, wherein said housing includes a pair of opposite side edges, said depression being mounted on one of said side edges, a second depression on the other side edge, a second light source aimed at a second optical switch across said second depression, said vehicle having left and right turn signal indicators, said control means being responsive to one of said optical switches controlling said left turn signal indicator and to the other optical switch for controlling the right turn signal.

3. Switching mechanism as claimed in claim 2, wherein said control means includes means responsive to the speed of the vehicle for canceling a turn signal when the speed of the vehicle attains a predetermined level.

4. Switching mechanism as claimed in claim 2, wherein said control means is responsive to said optical switches to turn off a corresponding turn signal after the corresponding turn signal has been turned on, whereby the vehicle operator may turn off a turn signal by placing a finger in the depression controlling the corresponding turn signal.

5. Switching mechanism as claimed in claim 1, wherein a second depression in said housing separates a second light source aimed at a second optical switch, said vehicle having left and right turn signal indicators, said control means being responsive to one of said optical switches for controlling said left turn signal indicator and to the other optical switch for controlling the right turn signal.

6. Switching mechanism as claimed in claim 5, wherein a third depression in said housing separates a third light source and a third optical switch, said vehicle having headlamps switchable between high beams and low beams, said control means being responsive to said third optical switch for controlling switching of the headlamps between said high and low beams.

7. Switching mechanism as claimed in claim 5, wherein said vehicle is equipped with an emergency flasher warning system and said housing includes another depression, a light source and an optical switch separated from said light source by said another depression, said control means actuating the emergency flasher system in response to interruption a light beam of said light source traveling across said another depression to said optical switch.

8. Switching mechanism as claimed in claim 2, wherein said housing includes an end edge, an end edge depression in said end edge separating an end edge light source from an end edge optical switch, said vehicle having headlamps switchable between high beams and low beams, said control means being responsive to said end edge optical switch for controlling switching of the headlamps between said high and low beams.

9. Switching mechanism as claimed in claim 8, wherein said housing includes a transverse surface interconnecting said side surfaces and said end edge, a transverse surface depression in said transverse surface separating a transverse surface light source from a transverse surface optical switch, said vehicle being equipped with an emergency flasher warning system, said control means being responsive to said transverse optical switch for controlling said emergency flasher warning system.

10. Switching mechanism as claimed in claim 1, wherein said depression is sized to accommodate a human finger.

11. A switching mechanism for controlling a vehicle function comprising a housing mounting an optical switch, said optical switch comprising a light emitting source and an optically responsive device in optical alignment with an air gap therebetween exposed to a driver of the vehicle, said optical switch being operable in response to interruption of light, and a control mechanism responsive to said optical switch for controlling said vehicle function, whereby the vehicle operator may control said vehicle function by interrupting light with a finger between said light emitting source and said optically responsive device.

12. The switching mechanism of claim 11, wherein said housing has at least one concavity formed with generally opposing surfaces, said light emitting source being mounted adjacent to one of said generally opposing surfaces and mounted to emit light towards the other of said opposing surfaces, and said optically responsive device is positioned adjacent a second of said opposing surfaces and mounted to receive said light from said light emitting source.

13. The switching mechanism of claim 11, wherein said housing comprises a plurality of concavities and a plurality of optical switches mounted across said concavities.

14. The switching mechanism of claim 13, wherein said housing includes two optical switches for operating left and right turn signals.

15. The switching mechanism of claim 12, wherein said housing includes a pair of opposite side edges, said concavity being positioned on one of said side edges, a second concavity being positioned on the other side edge, and a second optical switch mounted across said second concavity with a second light emitting source in optical alignment with a second optically responsive device.

16. The switching mechanism of claim 15, wherein said vehicle has left and right turn signal indicators, said control mechanism being responsive to one of said optical switches controlling said left turn signal indicator and to the other optical switch for controlling the right turn signal indicator.

17. The switching mechanism as claimed in claim 15, wherein said control mechanism is responsive to the speed of the vehicle for canceling a turn signal when the speed of the vehicle attains a predetermined level.

18. The switching mechanism as claimed in claim 15, wherein said control mechanism is responsive to said optical switches to turn off a corresponding turn signal after the corresponding turn signal has been turned on, whereby the vehicle operator may turn off a turn signal by placing a finger in the concavity controlling the corresponding turn signal.

19. The switching mechanism as claimed in claim 14, wherein a third concavity in said housing separates a third light source and a third optical switch, said vehicle having headlamps switchable between high beams and low beams, said control means being responsive to said third optical switch for controlling switching of the headlamps between said high and low beams.

20. Switching mechanism as claimed in claim 14, wherein said vehicle is equipped with an emergency flasher warning system and said housing includes another concavity, a light source and an optical switch separated from said light source by said another concavity, said control means actuating the emergency flasher system in response to interruption of a light beam of said light source traveling across said another concavity to said optical switch.

21. Switching mechanism as claimed in claim 15, wherein said housing includes an end edge and a transverse surface interconnecting said side edges and said end edge, a transverse surface concavity in said transverse surface separating a transverse surface light source from a transverse surface optical switch, said vehicle being equipped with an emergency flasher warning system, said control means being responsive to said transverse surface optical switch for controlling said emergency flasher warning system.

22. Switching mechanism as claimed in claim 12, wherein said concavity is sized to accommodate a human finger.

* * * * *